United States Patent [19]
Sizer, II et al.

[11] Patent Number: 6,036,086
[45] Date of Patent: *Mar. 14, 2000

[54] APPARATUS AND METHOD FOR INITIATING A TELEPHONE TRANSACTION USING A SCANNER

[75] Inventors: Theodore Sizer, II, Little Silver; Katherine G. August, Matawan; Mark L. Tuomenoksa, Shrewsbury, all of N.J.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/828,461

[22] Filed: Mar. 28, 1997

[51] Int. Cl.⁷ ..................................................... G06F 17/00
[52] U.S. Cl. ..................... 235/375; 235/472.02; 235/385
[58] Field of Search ..................................... 235/375, 380, 235/472, 462.01, 381, 383, 385, 472.01, 472.02, 472.03

[56] References Cited

U.S. PATENT DOCUMENTS

| | | | |
|---|---|---|---|
| 4,654,514 | 3/1987 | Watson et al. | 235/385 |
| 4,835,372 | 5/1989 | Gombrich et al. | 235/375 |
| 4,857,716 | 8/1989 | Gombrich et al. | 235/462 |
| 4,937,853 | 6/1990 | Brule et al. | 379/96 |
| 4,952,785 | 8/1990 | Kikuda | 235/375 X |
| 5,047,614 | 9/1991 | Bianco | 235/385 |
| 5,057,677 | 10/1991 | Bertagna et al. | 235/385 X |
| 5,157,687 | 10/1992 | Tymes | 235/385 X |
| 5,171,977 | 12/1992 | Morrison | 235/375 |
| 5,288,976 | 2/1994 | Citron et al. | 235/375 |
| 5,289,378 | 2/1994 | Miller et al. | 235/385 X |
| 5,299,116 | 3/1994 | Owens et al. | 235/385 X |
| 5,324,922 | 6/1994 | Roberts | 235/375 |
| 5,334,824 | 8/1994 | Martinez | 235/385 X |
| 5,359,182 | 10/1994 | Schilling | 235/375 X |
| 5,465,291 | 11/1995 | Barrus et al. | 235/375 X |
| 5,594,226 | 1/1997 | Steger | 235/375 X |
| 5,661,291 | 8/1997 | Ahearn et al. | 235/472 |

*Primary Examiner*—Michael G Lee

[57] ABSTRACT

In accordance with the present invention, an apparatus initiates a transaction and includes a capture device for capturing transaction data from marks contained on an object. The marks have a code corresponding to transaction data for initiating a transaction. The capture device includes a scanner, operable by a user, for reading marks contained on the object. A controller interprets the marks and retrieves the transaction data embedded in the marks. The capture device originates a telephone call and transfers at least a portion of the transaction data to a desired destination for initiating a transaction.

19 Claims, 4 Drawing Sheets

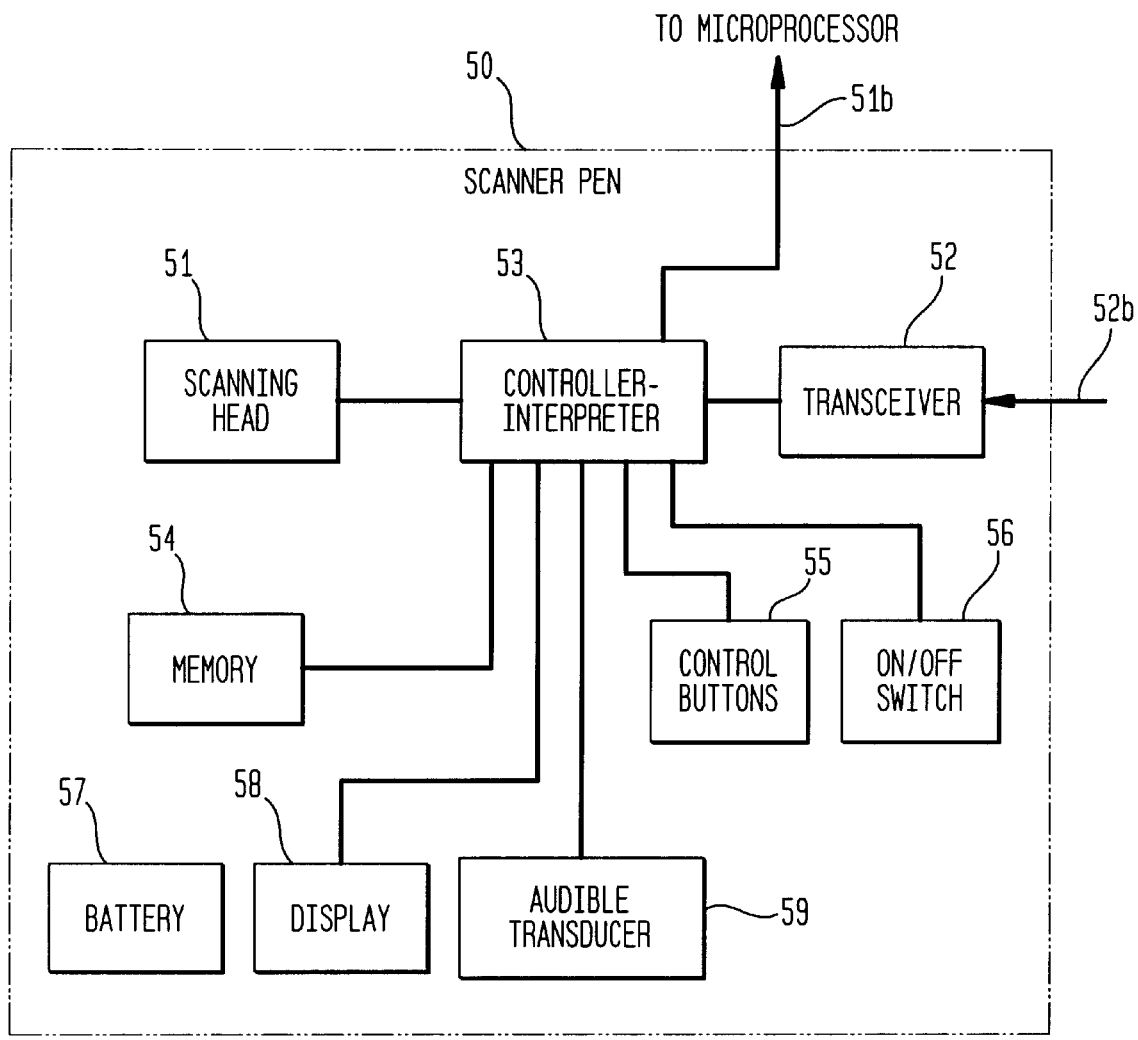

APPARATUS AND METHOD FOR INITIATING A TELEPHONE TRANSACTION USING A SCANNER

FIELD OF THE INVENTION

This patent application is related to an apparatus and method for initiating a transaction by scanning marks embedded on an object to retrieve transaction data for initiating a transaction.

BACKGROUND OF THE INVENTION

In copending and commonly assigned patent application filed by K. G. August et al. and entitled System And Method For Wireless Capture Of Encoded Data Transmitted With A Television, Video Or Audio Signal And Subsequent Initiation Of A Transaction Using Such Data, a portable capture device is used to capture in a wireless manner encoded non-perceptible data from a light emitting device such as a television or other video or audio output device. The capture device uses the captured data to initiate a transaction, such as placing a telephone call and transmitting a message to a remote agent or automated attendant, and delivering the data to a point-of-sale agent directly or indirectly via a telecommunication connection.

This data is part of the ordinary program displayed by the device and yet indiscernible by a viewer or listener. As an example, a television monitor may be located in a kiosk or other public area, and display the advertising of selected services and products. The indiscernible data may be information needed to order those services or products, including prices, delivery intervals, shipping details, coupon offers, and other related information.

Capture can be effected by decoding subliminally modulated video broadcast signals, in a manner suggested in U.S. Pat. No. 4,807,031, issued on Feb. 21, 1989, to R. S. Broughton, et al., the teachings which are incorporated herein by reference in their entirety. Alternatively, a modulated carrier, which, for example, can be an amplitude shift keyed (ASK) or frequency shift keyed (FSK) signal having its primary frequency components at a frequency (e.g. 25 kHz) not usually present in a conventional television signal, can be added only to the luminance component of a television signal, and the data can thereafter be captured using bandpass filtering and an ASK or FSK receiver. The device includes a memory for storing the data for later use, and communications circuitry to output at least portions of the data (or data derived from the captured data) to a remote agent or device, such as via a telephone call or a data transfer to a point of sale device.

The encoded non-perceptible data can include associated dialing, routing, or other identification information, so that other portions of the captured data can be transmitted to an appropriate final destination or device. In this context, the final destination can be (a) a remote location, such as a platform arranged to process and consummate transactions, or (b) a point of sale system or other device (e.g., TV, stereo, VCR Plus, smart mouse device, computer, etc.). The other portions of the captured data are part of the payload to be communicated to the final destination or device, and can include product or coupon information that is related to the display from which the non-perceptible data was captured, as well as programming or control data. Other information could include consumer profile information, such as the name, address, credit card number, personal preferences and other personal information.

The capture device can include a built-in-display, such as an LCD display, and the encoded non-perceptible data can include display information, so that at least portions of the captured data can be discerned by a user of the device, and the user can thus be kept informed as to the operation of the device. The memory and the communications circuitry in the capture device are advantageously arranged so that, in a transaction initiated by the device using captured information, a two-way dialog may be initiated between the user and an agent at a remote terminal or a POTS system, and information may be transmitted to and stored in the device for later retrieval.

In a copending application entitled "System and Method of Capturing Encoded Data Transmitted Over a Communications Network in a Video System" filed on behalf of Isenberg and Tuomenoksa on Mar. 18, 1994, Ser. No. 08/210,802 and assigned to the same assignee as the present application, it was recognized that non-perceptible information can be encoded in a television program, captured in a "set top box", and thereafter used to make telephone calls. The set top box is an electrical device that is "hard-wired" directly in the circuit between the video services network and the television set (as a stand alone unit or alternatively as part of the television set itself) and thus, unfortunately, is not portable. Also, the set top box is dedicated to one particular television (or other video source) and thus cannot be shared among several sources. Captured information may not be data, but could be reference pointers to data stored remotely, and needed in order to initiate a transaction. Finally, the user of the set top box may be uncertain as to the nature of the information captured therein.

The above disclosures provide a system and method for initiating a transaction using wireless capture of information obtained from a video/audio device. However, often consumers view many advertisements and program solicitations in magazines, newspapers and many types of printed media. Sometimes advertisements are contained on kiosks, bulletin boards and other locations. It would be advantageous if select pieces of information concerning the advertisement or solicitation could be retrieved to initiate a transaction by dialing a telephone number concerning the vendor of that particular advertisement or solicitation and then initiating a transaction automatically.

SUMMARY OF THE INVENTION

The present invention now allows a transaction to be initiated by a capture device that captures transaction data from marks contained on an object, such as printed indicia in a magazine. The marks have embedded therein a code corresponding to transaction data for initiating a transaction. The capture device includes a scanner, operable by user, for reading marks contained on the object. A controller interprets the marks and retrieves transaction data embedded in the marks. The capture device includes circuitry associated therewith for originating a telephone call and transferring at least a portion of the transaction data to a desired destination for initiating a transaction. The marks to be scanned can include a conventional style bar code, alphanumeric characters, or Xerox glyphs on the surface of the object.

In another aspect of the present invention, the capture device can include a memory for storing the marks. At least a portion of the transaction data can be displayed on a LCD or similar type of display. The transaction data also can include dialing information for originating a telephone call and descriptive information about an advertisement or solicitation that is associated with the marks.

The capture device can comprise a portable phone having the scanner mounted therein. The portable phone would transfer the scanned marks to a personal base station having a controller for interpreting the marks. The personal base station also would originate the telephone call to appropriate circuitry contained therein. In still another aspect of the present invention, the capture device can comprise a handheld scanner that sends scanner signals to a phone or portable base station having a controller for interpreting the scanned marks.

DESCRIPTION OF THE DRAWINGS

The present invention will be more fully appreciated by consideration of the following Detailed Description, which should be read in light of the accompanying drawings in which:

FIG. 5 shows an illustrative block diagram of the scanner component of the wireless capture device.

DETAILED DESCRIPTION OF THE INVENTION

Figure 1:
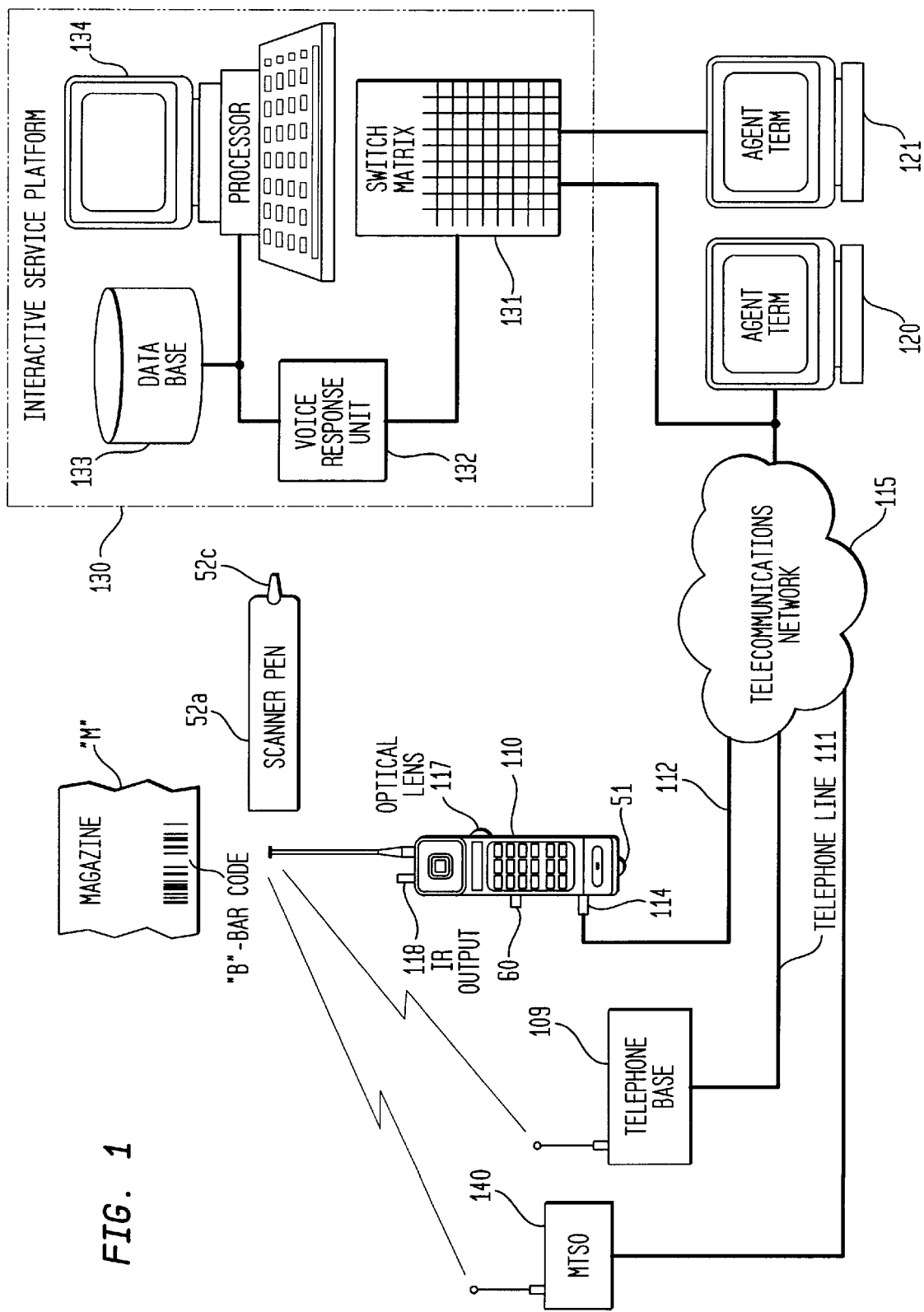
FIG. 1 is a schematic, drawing of one embodiment of a system arranged for capture of encoded data transmitted using the scanner.

Referring now to FIGS. 1 and 5, there is illustrated at 50 a scanner unit (FIG. 5) that is part of portable capture device 110 (FIG. 1). The scanner 50 unit includes a scanning head 51 positioned on the bottom of the wireless capture device 110. In the particular embodiment illustrated with the scanner head 51 positioned on the bottom of the wireless capture device 110, the device is manually oriented in use so that the scanner head 51 moves over the marks to be read. The scanner unit 50 is wired directly to a microprocessor 220 (FIG. 2) of the device 110 and works in a manner that will be explained below.

For purposes of understanding, the scanner unit 50 will be discussed first followed by general description of the portable capture device 110 and associated units illustrated in FIGS. 1 and 2. The scanner unit 50 can communicate with the microprocessor 220 through a hard wire link 51b. Additionally, as shown in FIG. 5, the scanning unit 50 can include a transceiver 52 which allows the scanner unit to communicate with a scanner pen 52a via a wireless link 52b, such as a radio link, infrared or other communication links known to those skilled in the art. The scanner pen 52b has a normal scanning head 52c to read marks on an object being scanned. The transceiver 52 would receive with the unprocessed output from the scanning head 52c of the scanner pen over the link 52b. The scanner unit 50 also includes a controller/interpreter 53 that decodes unprocessed output from a scanner head 51 into a more compact or standardized code or format for communication as part of transaction data and as data to be later processed by a microprocessor 220. An on/off switch 56 enables a user to turn on and turn off the scanner unit to conserve power or a battery 57 if battery power is used.

A memory 54 can allow a user to scan at one period of time, and then store the information for later transmittal to the controller/interpreter 53 and microprocessor 220 at a later time. The retrieval of data from memory SA can be controlled by transmit control buttons 55. An optional display 58 may provide visual feedback for communication, or it can display previously scanned marks in a human-readable format. A scan control button as one of the control buttons 55 could enable a user to scroll through a plurality of previously scanned marks. An optional audible transducer 59 can provide audible feedback to the user, indicating that a successful scan of the object has occurred that the microprocessor 220 has received information from the scanner unit 50.

The scanner unit 50 of the present invention can be used in combination with marks that represents a unique code for transaction data. A standard bar code format could be used, which has encoded therein an 800 number to be called and other necessary information for completing a transaction. Xerox glyphs also could be appropriate because the glyphs can encode a large amount of data in a short space. FIG. 1 illustrates an object "M" in the form of a Magazine page having a bar code "B" adjacent an advertisement so that information can be gathered concerning the advertisement for initiating a transaction. Additionally, alphanumeric characters could be scanned, which specify a unique identifier for various advertisements.

Naturally, the device 110 can include a scanner unit 50 having the scanner head 51 as an integral part of the device 110, but also could include a port 60 that could be wired directly to a scanner pen 52.

There is now described in greater detail various ways in which transactions can be completed and data captured within the wireless capture device 110 of the present invention. The following description explains one type of apparatus, system, and method which could be used for the present invention. Others could be devised by those skilled in the art. The scanner unit 50 of the present invention would be incorporated within the apparatus as described or work closely with the apparatus as described.

Referring first to FIG. 1, and for purposes of background, there is shown a schematic drawing of the environment arranged for the capture of encoded data from the scanner pen, and subsequent use of the captured date to initiate a transaction with a person at an agent terminal 120, or a person at another terminal 121 that is supported by an interactive service platform 130.

It should be understood that the data could also be received from a light emitting device such as a television or audio signal from a speaker. In that instance, in a television signal would be received by a television via over-the-air transmission, as from transmission tower via a transmission link, or alternatively supplied by a cable TV connection, or from a VCR/video-tape. The video portion of the television signal could be displayed on the picture tube or other visual display area of a monitor, computer or a television, while the audio portion of the television signal is played from speaker. Associated with the program that is seen and possibly heard by a viewer/listener could be non-discernible encoded data that is transmitted as part of the video and possibly audio signal. For example, the program may be an advertisement for a service or product, and the indiscernible data may create a subliminal visual pattern on the visual display area, that when properly received and decoded, contains information needed to order those services or products, including prices, delivery intervals, shipping details, coupon offers, and so-on.

Encoding, transmission and decoding of non-discernible data in this instance could be accomplished as described in a patent application entitled "System and Method for Encoding Digital Information in a Television Signal" filed on behalf of T. Sizer and assigned to the same assignee as the present application, which co-pending application is incorporated herein by reference. Briefly, it was found using a spectrum analyzer on a typical video signal, that there are comparatively large frequency components at the line rate and at the frame rate and its harmonics, but that between these frequencies, there are other frequency bands in which little information is carried. One such frequency band is between 15 and 30 kHz. By adding a low level carrier signal or tone at a frequency in this band, say 25 kHz, the video image is not degraded, but a properly tuned decoder can receive and decode the encoded information. In this way, digital information can be subliminally inserted in a video signal by adding to the video signal an amplitude shift keyed (ASK) or frequency shift keyed (FSK) carrier signal, and the digital information can later be recovered using ASK or FSK decoding. Encoded data can also be inserted in a television signal and recovered by a received that responds to the picture displayed on the television, in the manner described in U.S. Pat. No. 4,807,031 cited above.

The data is received from the scanner pen and within the portable capture device 110, which is described in more detail in connection with FIG. 2. If any non-discernible encoded data is part of a video signal, such sensing takes the form of light from display area being collected by an optical lens 117. When the non-discernible encoded data is part of the audio signal, such sensing can take the form of sound from a speaker that is collected by a microphone 211 (FIG. 2). In either event, there could be wireless communication of the information from the scanner pen and in some instances where a more complicated device is used, from a television to capture device 110 such that the encoded data is "viewed" or "heard" rather than transmitted through a wired connection, or through a more conventional radio frequency communication.

In addition to receiving non-discernible encoded data from the scanner pen, the capture device 110 has the capability of (a) storing the encoded data, (b) transmitting (or otherwise outputting) the encoded data (or information retrieved using such data) to a remote location or device, and (c) displaying the encoded data to a user. The data may include information for initiating a transaction or originating a telephone call, as well as additional information (e.g., price and ordering information) associated with the scanned material. The remote location can be agent terminals 120 or 121, interactive service platform 130, or a point of sale system, and the communication between the capture device 110 and the remote location may be one-way or two-way.

In the case where encoded data is to be output from capture device 110 via a telephone call, the call may be initiated and transacted in one of several ways, as illustrated in FIG. 1. First, the data may be transmitted over a wireless link to an associated telephone base station 109 that is, in turn, connected to a telephone line 111 that is part of a telecommunications network 115. Communication between capture device 110 and base station 109 may be accomplished in a variety of ways; as an example, the same signaling and transmission can be used as is presently used in communication between a cordless telephone handset and its associated base station. Second, capture device 110 may be directly connected to a telephone line 112 through an interface that includes a standard telephone jack 114. Third, capture device 110 may include the functionality of a cellular telephone, so that the data may be communicated to a remote location via a wireless call placed to a mobile telephone switching office (MTSP) 140, which is in turn connected to telecommunications network 115.

Figure 2:
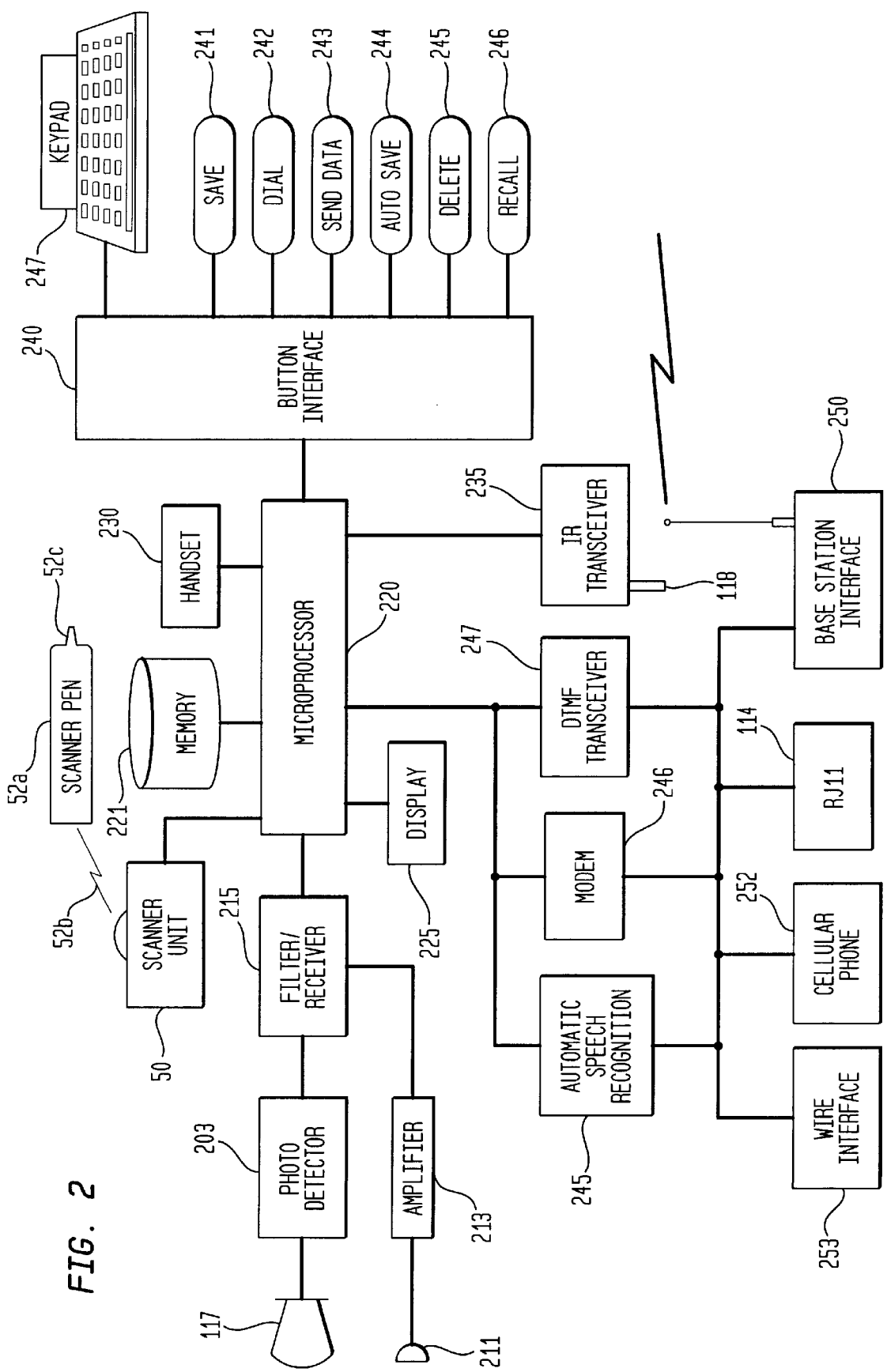
FIG. 2 is a block diagram illustrating the components of the capture device of FIG. 1.

As explained more fully in connection with FIG. 2, capture device 110 may include a dual tone multi-frequency (DTMF) transceiver arranged to generate a series of audible tones. Accordingly, a fourth way to initiate a telephone call would apply portions of the data to the transmitter (tone generator) portion of the DTMF transceiver. Capture device 110 may then be placed in juxtaposition with the microphone portion of a conventional telephone handset, such that the audible tones generated in capture device 110 are acoustically coupled through the handset to receivers in telecommunications network 115.

Capture device 110 can also output encoded data directly, without making a telephone call. This is useful in conjunction with a point of sale system or the like, which includes a docking station or other interface to which the capture device may be connected, or an IR receiving device or a device responding to DTMF.

If an outgoing telephone call in initiated by capture device 110, the call can illustratively be routed through telecommunications network 115 directly to an agent terminal 120, or to an interactive service platform 130, which is connected to another agent terminal 121. When a connection is completed to platform 130, the call may be routed by a switch matrix 131 to a voice response unit 132 that operates under the control of a processor 134. Information included in the captured encoded can be provided to the attendants, or processor 134 can perform a look-up and retrieval operation in database 131, using encoded data as a key, in order to effectuate a desired transaction.

For certain transactions, information connected with a transaction may also be transmitted from service platform 130 to capture device 110, either for display to a user, storage for later use, or output to a point of sale system or device. This information may, for example, be confirmation information, indicating that a transaction has been effected, or details regarding a just completed transaction, such as ticket information relating to a travel reservation.

Referring now to FIG. 2 there is shown a block diagram illustrating in more detail the components in one embodiment of capture device 110 of FIG. 1. If the encoded non-perceptible data is inserted in the video portion of a television signal, the images displayed on a visual display area a monitor or television are captured by optical lens 117 and an associated photo-detector 203, which is arranged to supply an electrical signal to a filter/receiver 215 representing the image.

On the other hand, if the encoded non-perceptible data is inserted in the audio portion of a television signal, e.g. the output from a speaker is captured by a microphone 211 and an associated amplifier 213, which is arranged to supply an electrical signal to filter/receiver 215 representing the sound energy. In either event, the encoded non-perceptible data is decoded in the filter/receiver 215 in a manner consistent with the manner in which the original data was encoded. Thus, filter/receiver 215 can be arranged to perform the same functionality as the elements illustrated in FIG. 4 of the above referenced Broughton et al. patent, or, alternatively, the operation of filter/receiver 215 can be as described in conjunction with FIGS. 4 or 7 in the copending application of T. Sizer. In each instance, it is noted that the capture device 110 receives encoded data by receiving scanned data from the scanner pen 52a and in some instances with more complicated devices, by "watching" or "listening to" the output of a television (or another similar display device), and that the capture device 110 is not connected to television or the other display device by a cable or wires.

The output of filter/receiver 215, representing the data captured by capture device 110, is applied to a microprocessor 220, which is arranged to perform various data processing and control functions in coordination with programs stored in an associated memory 221 as well as inputs received from a user of capture device 110. Generally speaking, capture device 110 may operate in an active or a passive mode. In the active mode, capture device 100 responds only to user initiated capture commands. In the passive mode, capture device 110 captures all of the data sent to it while in that mode. In either mode, captured data may be routed by microprocessor to memory 221 and stored for use at a later time, as determined by the user. The captured data may also be displayed on a display 225, such as a liquid crystal display, so that a user will be aware of exactly what information was captured.

The control programs contained in memory 221 can implement numerous functions, which broadly speaking, can be categorized as (a) functions relating to data capture, such as SAVE and AUTOSAVE functions, (b) functions relating to output of already captured data, such as DIAL and SEND DATA functions, (c) functions relating to memory manipulation, such as the RECALL and DELETE functions. The above enumerated functions are initiated when respective buttons 241–246 are activated, and the activation signal output from a button is applied to microprocessor 220 via a button interface 240. Each of the functions is discussed below.

When the SAVE function is initiated by activation of button 241, the capture device 110 is in the active mode, and the encoded data received from a scanner or contained in the current audio or video output of a television is captured. This is accomplished, for example, by activating optical lens 117 and photo detector 203, or microphone 211 and amplifier 213, for a relatively brief period of time, typically on the order of several seconds, so that encoded data associated with the current program is processed by filter/receiver 215 and stored in memory 221. A visual or auditory cue could be contained in the video or audio program to indicate to a user of a capture device that there is data to be captured. When the SAVE function is activated for the scanner or a television signal, the microprocessor 220 may control display 225 to indicate the current status, e.g., that the capture device is in the process of receiving and capturing data. When the data has been captured, the microprocessor 220 may control the display 225 to actually display some or all of the data, so that the user can be aware of information that had been subliminal and indiscernible. The display can also indicate that the device is "aimed" correctly.

When the AUTOSAVE function in initiated by activation of button 244, capture device 110 is in the passive mode. In this mode, capture device 110 captures a series of encoded data that may be contained from scanned material or in each of a series of programs that can be viewed or heard on a television. This can be accomplished, for example, by activating optical lens 117 and photo detector 203, or microphone 211 and amplifier 213, for a relatively long period of time, typically on the order of several minutes or hours. Encoded data captured from the various programs that are displayed on display area 105 or played through loudspeaker 106 over a long period of time are processed by filter/receiver 215 and stored in memory 221. As with the SAVE function, when the AUTOSAVE function is activated, microprocessor 220 may be arranged to control display 225 so as to indicate the current status, e.g., that the capture device is in the process of receiving and capturing data.

It should be understood that the autosave function is used with a more complicated device having means for receiving audio and visual signals.

When a user of capture device 110 desires to use any of the data stored in memory 221, including data stored as a result of the AUTOSAVE function, the contents of the memory 221 may be retrieved and displayed on display 225 by initiating the RECALL function upon activating button 245. This permits a user to be aware of exactly what information was previously captured and stored. Through this function, the user will be able to selectively peruse or scroll through the stored data, so as to retain or use selected portions thereof. Activation of button 246 initiates the DELETE function, whereby portions of the data stored in memory 221 are selectively erased. In order to conserve and thereby "recycle" the storage capacity of memory 221, the microprocessor 220 may also be arranged to manage the contents in memory 221, so that the oldest information stored therein could be cycled out and deleted as new information is captured and stored.

Turning now to consideration of the use of already captured data, it is an important functionality of capture device 110 to permit such data to be output upon a command from a user. Such data, when output, can be used to (a) make a telephone call, and, when the call is answered, to provide information to a live or automated attendant that received the call, or (b) initiate a transaction, such as by interacting with a special purpose terminal or kiosk arranged to receive the stored data, or a device such as a VCR Plus or a stereo. In accordance with the arrangement shown in FIG. 2, data output via a telephone call can be initiated in several ways.

First, captured data can be routed by microprocessor 220 from memory 221 to a modem 246 and then to a base station interface 250, so that the information can be communicated to telephone base 109 of FIG. 1. This in turn allows a conventional telephone call to be originated from telephone base 109.

Second, captured data can be routed through modem 246 to a wire interface 253, which allows capture device 110 to be physically connected to a terminal or docking station for information off loading.

Third, captured data can be routed to a DTMF transceiver 247, which includes a tone generator arranged to output DTMF tones. These tones can be directly connected to a telephone line 112 via a standard connection such as RJ11 jack 114. Alternatively, capture device 110 can be placed in juxtaposition with the microphone in a telephone handset, and the audible tones can be applied and used much like an audible frequency autodialer.

Fourth, captured data can be routed through modem 246 to a cellular telephone 252, which can initiate a cellular call. When a cellular connection is completed, the captured data can be output in encoded form or an audible tones.

For each of the arrangements just described, a telephone call may be originated using the DIAL function. This function in initiated by activation of button 242. With this function, dialing information, which is part of the data captured by capture device 110 and now stored in memory 221, is retrieved. This information is then further processed, so that a telephone call can be initiated. In some instances, a call is originated by application of stored data to DTMF transcriber 247, so that audible tones can be output. In other instances, a data call can be initiated by appropriately formatting stored data. In yet other instances, such as when a cellular call is dialed, stored dialing information may be applied to an outgoing number register. The exact manner in which information is output from the capture device 110 can vary, in accordance with several embodiments of the present invention.

While the DIAL function is used to output certain captured information needed to initiate a telephone call (or other data output function), the SEND DATA function, initiated by activation of button 243, is used to output other portions of the captured data stored in memory 221, pertaining, for example, to a transaction that the user desires to make. This additional data is retrieved from memory 221 and appropriately transmitted, depending upon the manner and type of telephone call involved. Thus, data may be output either via base station interface 250 to telephone base 109, or via RJ11 jack 114 onto telephone line 112, or via cellular phone 252 to MTSO 140. Note that if output occurs directly, without a telephone call, the SEND DATA function may cause information from memory 221 to be output via wire interface 253. During the SEND DATA function, the information being output may also be displayed on display 225. This allows a person using the capture device to identify the information that was captured, and use the information in an actual transaction.

It is to be noted here that capture device 110 of FIG. 1 may optionally include an automatic speech recognition circuit 245, an infrared (IR) transmitter 235, a handset 230 and a keypad 247. The purpose of IR transmitter 235 is to allow captured data to be output directly to a device such as a point of sale system or a VCR or the like, via infrared transmission. The purpose of speech recognition circuit 245 is to convert captured data to spoken phrases, which can be played to a user or to an attendant after a telephone call is initiated. The purpose of handset 230 and keypad 247 is to allow capture device 110, in addition to being used in accordance with the present invention, to be used to complete conventional dialed telephone calls.

For background purposes, a televised advertisement for a product could include additional ordering or "coupon" information embedded in a subliminal visual pattern within the video image displayed on a television. The coupon information describes the item(s) offered for sale, the regular price, the coupon value, and contains additional information needed for ordering. This embedded information could be transmitted between a television and capture device at a rate of about 60 bits per second, that is sufficient such that the necessary information can be transmitted in a very brief period of time. In the application just described, the embedded product information, dialing number, coupon information and necessary checkbits together comprise approximately 2,000 bits of information, so that between three and four seconds would be required for transmission. Once the coupon information is stored in capture device 110, the user of the capture device can supplement the coupon information with user entered data which can be entered using keypad 247. This supplemental information may include credit card or other billing information pertaining to the user, as an example.

Figure 3:
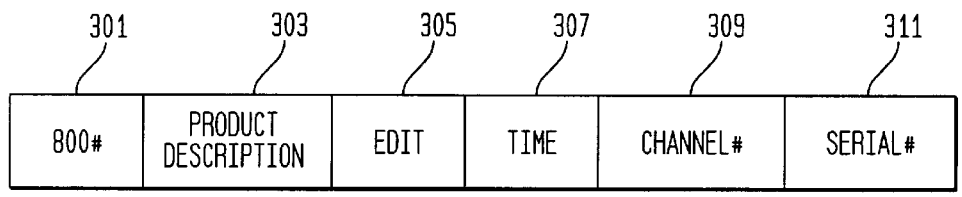
FIG. 3 is a diagram illustrating one example of the format of captured data.

As shown in FIG. 3, the information represented by the encoded data such as from the scanner can be organized in several fields. Using the coupon application as an example, a first field 301 contains a telephone number which may be used to originate a telephone call in order to order the product to which the coupon applies. Illustratively, this will be a toll-free or "800" number. Other information associated with the coupon can include a product description in field 303, an expiration date in field 305, the time that the advertisement is televised in field 307, the number of television channel running the ad in field 309, and a serial number for the ad in field 311, identifying either or both the particular ad and its sequence in an ad campaign. It is to be noted that various other information can also be included in the information illustrated in FIG. 3, such as keywords or attributes describing the received encoded data, as well as information indicating that a product is available in particular colors or sizes. The keywords would be useful in retrieving from memory 221, information relating to specific products or advertisers.

Figure 4:
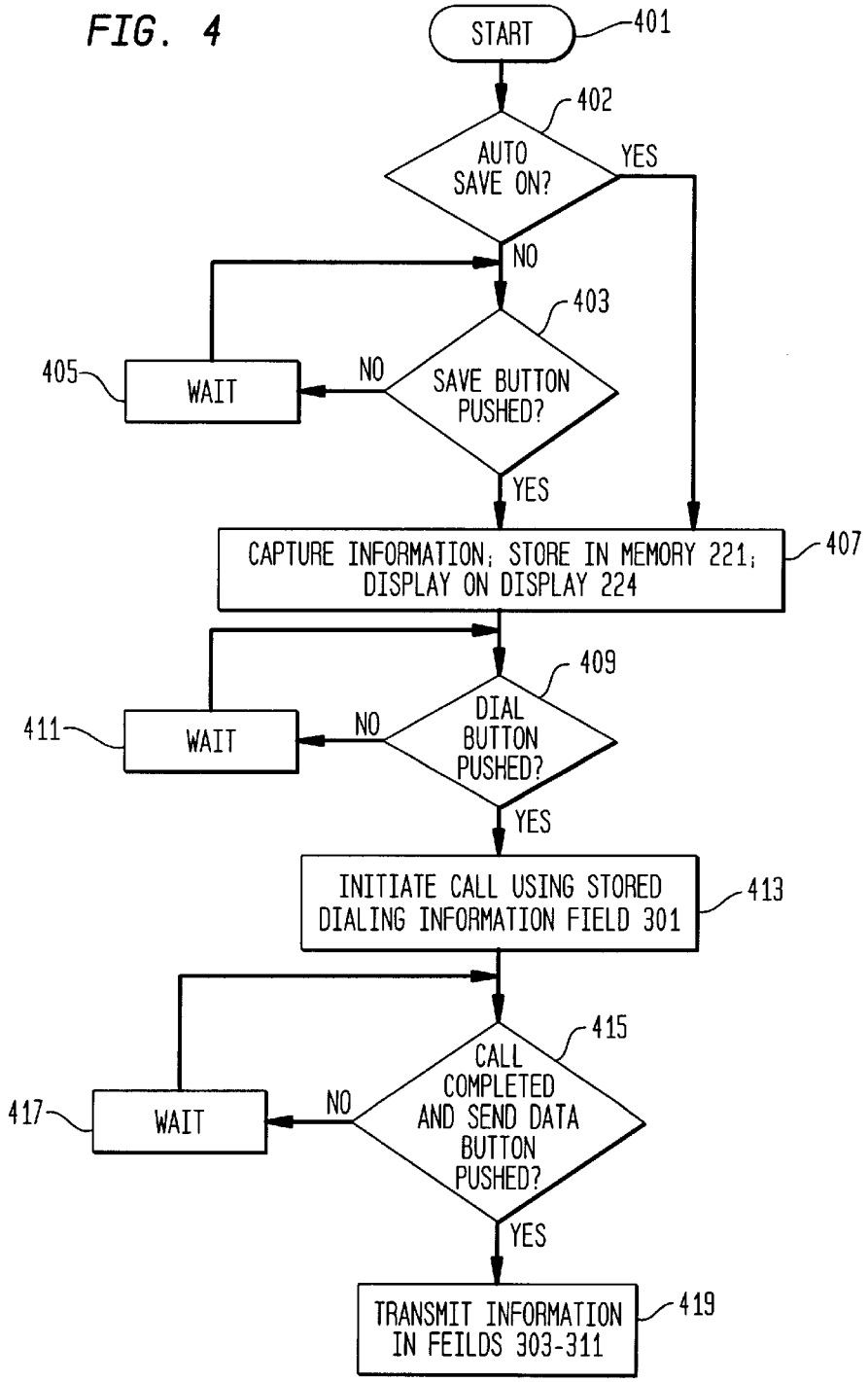
FIG. 4 is a flow diagram of the process by which data embedded in a subliminal visual or non-audible message is captured and used.

The process by which information embedded in a subliminal visual, audible message or scanned indicia is captured and used is illustrated in flow diagram form in FIG. 4. As indicated previously, two general modes of operation are contemplated, namely a "passive" mode and an "active" mode, both of which follow a "start" step 401.

In the passive mode, a user desires to operate the capture device 110 in an unattended manner, and to capture all of the encoded data that may be subliminally displayed on a display device or output from speaker over a relatively long period of time, typically several minutes or hours, until the user, at some later time, desires to discontinue or terminate the capture. This mode is initiated using AUTOSAVE functionality, by activating button 244. When this is done, a positive response is obtained in step 502, so that data capture, storage and display, all as described below in connection with step 507, occur. While in the passive mode, capture is terminated by subsequent activation of the same button 224.

In the active mode, a user operates capture device 110 in real time, typically while scanning a product or bar code, or in more complicated devices viewing a video display or listening to an audio presentation. Scanning a product or bar code, or in more complicated devices the user activates the SAVE button 241. When button 241 is activated, a positive result occurs in step 503, thereby capturing the encoded data, displaying all or a portion of the data on display 225, and storing same in memory 221, all in step 507. Until the SAVE button is activated, capture device 110 may be in a "wait state" 505.

The user of capture device 110 determines that the appropriate data has been captured by reviewing the information seen in display 225. After the captured data has been reviewed and determined to be correct, activation of the DIAL button 242 on the portable capture device 110 in step 509 initiates step 513, by which stored dialing and/or routing information, illustratively in field 401 of FIG. 4, is recalled from memory 221. A call is then originated launch, such by transmitting the dialing information from memory 221 through base station interface 250 to base station 109 and thence to telephone line 111 and telecommunications network 115 to interactive service platform 130. The call may be a local or long distance call made using a "plain old telephone service" (POTS) line; alternatively, a toll-free call may be launched using an 800 number. Desirably, automatic number identification (ANI), called ID, and other features available in the telecommunications network may be used to provide additional information to the called party, in addition to the captured data that is transmitted in succeeding steps in the process. Until the DIAL button is activated, capture device 110 may be in a "wait state" 511.

After the call has been originated, a determination is made in step 515 that the call has been answered and that the SEND DATA button 243 has been pushed. (Until the SEND DATA button is activated, capture device 110 may be in a "wait state" 517.). When a positive result occurs in step 515, information contained in fields 403–411 is transmitted to the called destination in step 519. As stated previously, from the point of view of the called party, the information received includes details concerning the advertised product, the identity of the caller, and other information associated with the item that was initially displayed or mentioned on the television program. Advantageously, the advertiser will know more about their customer that ever before. This is because the advertiser will be able to determine from the transmitted information which advertisement draw the business, how long it took the caller to respond to the ad, and the geographic location of the callers, based upon ANI or called ID. It will be easy to tell which ads in a campaign are most successful.

In accordance with one optional arrangement of the present invention, when data is captured and stored in step 507, they newly collected data is compared with previously stored data. When a match is found, any duplicate data is dropped. In addition, the information in various fields is examined, to assure that the data captured is in the appropriate format. If an error is detected in any data, the information may be deleted, and "new" data collected. This is accomplished by repeating capture step 507 several times.

In another application of the present invention, an interactive television capability is provided in connection with a game show or television drama. For a game show, an audience would be asked to vote on various aspects of the game. This could include questions such as which person should go on a date with the contestant, or which singer is the best? The audience would be instructed to press the "SAVE" button on their capture device at the appropriate time specified for their choice. The viewers vote would then be cast by depressing the DIAL button, communicating with the game show host, and then transmitting information indicating the vote by depressing the SEND DATA button. Alternately, one number could be transmitted and an automated interactive voice platform such as the InfoWorx™ platform available from AT&T could offer options to the caller. These calls could be toll free calls, or, alternatively, billed to the caller.

In yet another application of the present invention, a video on demand capability can be provided. A viewer sees a video he or she would like to see advertised on a previewing network. AN instruction to press the DIAL button on the capture device is made on the previewing channel to indicate to the viewer that he or she can press the button to order a particular video. The call would be placed to a voice response system used to reserve the video on demand. Information about which video the called wanted to see is sent over the phone lines once the call is connected. The caller would merely have to acknowledge the order and select a time slot.

The present invention can also be employed in the context of programming of a VCR, particularly where the user already has the capabilities provided by VCR Plus, a product that is commercially available. In this embodiment, a code sequence associated with and representing a particular television show constitutes the information included in a televised advertisement. When the ad is viewed, the viewer can press the SAVE button and send the sequences to the VCR Plus using IR transmitter 235. While the portability of capture device 110 is advantageous, it is to be noted that in some arrangements, the functions of capture device 110 and telephone base 109 may be combined in a single stationary unit, which might resemble a cordless telephone base station. In this event, the functionality of capture device 110 would be included in the stationary unit, and that unit would be arranged, in the manner previously described, to collect information. In this arrangement, the stationary unit could also be adapted to utilize input devices such as optical character recognition (OCR) or scanners that would provide an additional method of inputting telephone numbers and coupon and/or product information. The hand piece of this stationary unit would be used to place a call and send the data.

The present invention is not limited to live televised programs, but can also be operated in conjunction with stored video programs played from a VCR. In this arrangement, advertisements and other encoded information in included in videos at the time they are recorded or at the time they are mastered and put onto video cassettes. A viewer watching a video with such an ad can respond immediately to reserve another video, purchase one of the items advertised, or order catalogs automatically. When a program containing subliminally encoded data is viewed, the viewer simply presses the DIAL button, launching a telephone call, and then presses the SEND DATA button, sending captured data, such as product information, to an agent, who can verify the order using the additional information that was captured or stored in the device.

The portability of the present invention can be used to advantage in implementing what can, in effect, be called a "Roaming Bulletin Board". A user can be attending a conference or traveling through the airport where kiosks or bulletin boards are set up. In the case of a conference, an attendee would walk through the conference viewing the displays. When the attendee sees a display of interest, he or she points the capture device towards the display, and captures the non-discernible encoded data from either the displayed image or the sound output. Later, the user launches a telephone call to the telephone number specified and included in the captured data, and sends out coupon information that is also part of the captured data.

It is further to be noted that the present invention can be used in the context of automobiles and mobile telephones. When a capture device in accordance with the invention is placed in a car,, it can receive and capture non-discernible encoded data contained in the audio output of the car radio. The captured data can include a toll free or conventional telephone number for originating a mobile cellular telephone call from the car. The call may be placed to an interactive service platform, and additional captured data, such as coupon or similar information, can then be used to effectuate a transaction.

Various modification and adaptations of the present invention will be apparent to those skilled in the art. For example, the functions provided by the present invention may be combined with those used in a personal digital assistant (PDA) or a laptop computer. If desired, a simultaneous voice and data (SVD) modem of the type available now from AT&T could be provided in capture device 110 to allow communication both by voice and data transfer, at the same time. Various functions can also be added to the processes and applications described. For example, telephone base 109 may be programmed to dial a number of series of numbers at specific times, when certain amounts of information or data have been collected, or based upon some criteria. Capture device 110 could then send collected information "in bulk" to interactive service platform 130. For this purpose, modem 246 could be used, so as to send the information more efficiently.

In accordance with the present invention, a capture device now can initiate a transaction by capturing transaction data from marks contained on an object, such as a magazine advertisement, where the marks have embedded therein a code corresponding to transaction data for initiating a transaction. The capture device includes a scanner, operable by a user, for reading marks contained on the object and a controller for interpreting the marks and retrieving transaction data embedded in the marks. Through associated apparatus as described above, a telephone call can be originated by information contained in the transaction data in at least a portion of the transaction data transferred to a desired destination for initiating a transaction. As a result, it is now possible now for magazines, newspapers, printed media and many other objects to contain marks relating to an advertisement or solicitation which can be easily scanned and a transaction completed to the vendor of the advertisement or solicitation. This saves much time and allows easier access to services and products.

What has been described is merely illustrative of the present invention. Other applications to wireless telephones, computers or other communication systems other than the disclosed system are contemplated as being within the knowledge of one skilled in the art and may be utilized without departing from the spirit and scope of the present invention.

That which is claimed is:

1. An integrated, portable capture apparatus for initiating a telephone-based transaction, comprising:

a portable telephone;

a scanner integral with the portable telephone, operable by a user, for reading marks contained on an object, the marks having embedded therein a code corresponding to transaction data for initiating a transaction, controller means for interpreting the marks and retrieving transaction data embedded in the marks, and means within the capture device for originating a wireless telephone call based on the retrieved transaction data for initiating the transaction.

2. The apparatus according to claim 1 including a storage for storing the marks.

3. The apparatus according to claim 1 including a display for displaying at least a portion of the transaction data to a user.

4. The apparatus according to claim 1 wherein said transaction data includes dialing information for originating a telephone call.

5. The apparatus according to claim 1 wherein said transaction data includes descriptive information about an advertisement or solicitation that is associated with the marks.

6. The apparatus according to claim 1 wherein said means for originating a telephone call comprises a personal base station interface.

7. An apparatus for initiating a transaction, comprising:

a wireless capture device arranged for the wireless capture of data directly from an audio/visual display, said data being indiscernible by a viewer or listener, said capture device including means for receiving one of an audio and video stream having embedded therein a code containing transaction data for initiating a transaction, a filter for interpreting the marks and retrieving transaction data embedded in the marks, and means associated with the capture device for originating a wireless telephone call based on the retrieved transaction data.

8. The apparatus according to claim 7 including a storage for storing the marks.

9. The apparatus according to claim 7 including a display for displaying at least a portion of the transaction data to a user.

10. The apparatus according to claim 7 wherein said transaction data includes dialing information for originating a telephone call.

11. The apparatus according to claim 7 wherein said transaction data includes descriptive information about an advertisement or solicitation that is associated with the marks.

12. The apparatus according to claim 7 wherein said capture device comprises a portable phone, and said means for originating a telephone call comprises a personal base station interface.

13. The apparatus according to claim 7 wherein said capture device comprises a hand-held scanner.

14. A method for initiating a transaction in an integrated, wireless capture device that includes a portable telephone with a scanner comprising the steps of:

scanning marks contained on an object with the scanner, interpreting the scanned marks to retrieve transaction data embedded therein, and originating a wireless telephone call, based on the retrieved transaction data, to a desired destination for initiating a transaction.

15. The method according to claim 14 including displaying at least a portion of the transaction data to a user.

16. The method according to claim 14 wherein the transaction data includes dialing information for originating the wireless telephone call.

17. The method according to claim 14 wherein the transaction data includes descriptive information about an advertisement or solicitation that is associated with the marks.

18. The method according to claim 14 wherein originating step is performed by a personal base station interface integral with the capture device.

19. The method according to claim 14 wherein the capture device comprises a hand-held scanner.

* * * * *